2,980,671
MONOMETHINE CYANINE DYES AND METHOD FOR PREPARING THEM

Jean Marie Nys, Mortsel-Antwerp, and Theofiel Hubert Ghys, Edegem-Antwerp, Belgium, assignors to Gevaert Photo-Producten N.V., Mortsel, Belgium, a Belgian company No Drawing. Filed Apr. 15, 1958, Ser. No. 728,534

2 Claims. (Cl. 260—240.7)

The present invention relates to an improved method for preparing monomethine cyanine dyes, and to new dyes obtained according to this method. This application is a continuation-in-part of application Serial No. 616,371, filed October 17, 1956, now abandoned.

Some symmetrical monomethine thiacyanine dyes, either carrying an alkyl substituent at the carbon atom of the methine chain or not, have previously been prepared by reacting quaternary salts of thiazoles having an alkyl group in the 2-position with quaternary salts of the same thiazoles but having a reactive methyl mercapto group in the 2-position.

Such method was described already by Kiprianov, A. I., and Ushenko, I. K., in the J. Gen. Chem. USSR (English translation), 20 (1950), 139–148, and by Kiprianov, A. I., Yakovleva, L. P. and Rozum, Yu. S. in J. Gen. Chem. USSR (English translation), 22 (1952) 365–372, but involves the disadvantage that one starts from two different quaternary salts so that in some cases, besides the easily prepared thiazole containing in 2-position a reactive methyl mercapto group, the corresponding thiazole containing in 2-position a higher alkyl- or aralkyl group, the preparation of which is mostly cumbrous, should be available. Moreover, as also noted by Fry, D. J., and Kendall, J. D., in J. Chem. Soc., London (1951), 1723–1726, one should in the synthesis of monomethine cyanine dyes substituted in the methine chain take into account a side-reaction wherein the corresponding unsubstituted cyanine dye is formed, whereby the yield of the pure compound is decreased.

Now we have found an improved method for preparing dyes of this class having the advantages of simplicity and more economical operation.

In this way, the sometimes laborious synthesis of quaternary salts of the azoles containing in 2-position an alkyl or aralkyl group is avoided and, in the case of the monomethines substituted at the carbon atom of the methine chain, the yield is not decreased by the formation of side-products. Moreover, new dyes become available in this way for example monomethine cyanines substituted at the carbon atom of the methine chain with an aryl group, the preparation of which according to the methods hitherto known was not successful. The wide scope of our new method further appears from the fact that according to this process also complex symmetrical monomethine cyanine dyes can be prepared.

The importance of our present invention may further be accentuated by the fact that according to the new process of production, starting from intermediate compounds which may easily be prepared, symmetrical monomethine cyanine dyes carrying a substituent at the carbon atom of the methine chain may be obtained which show interesting optical anti-sensitizing properties upon incorporation in photographic emulsions.

It is, therefore, an object of our present invention to provide an improved method for preparing symmetrical monomethine cyanine dyes either carrying an alkyl, aralkyl or aryl substituent at the carbon atom of the methine chain or not. A further object is to provide new dyes obtained according to our new process. Still another object is to provide photographic elements containing the dyes obtained according to our new process. Further objects will appear from the following description.

According to our present invention symmetrical monomethine cyanine dyes which may carry an alkyl, for example ethyl, butyl or benzyl, or an aryl e.g. phenyl or naphthyl substituent at the carbon atom of the methine chain, are prepared by reacting quaternary salts of azole and hydrogenated azole bases having a reactive methyl mercapto group in the 2-position with aliphatic acid anhydrides which may carry an aryl substituent in the aliphatic chain in the presence of a base as condensation agent.

The reaction may be explained by the following scheme:

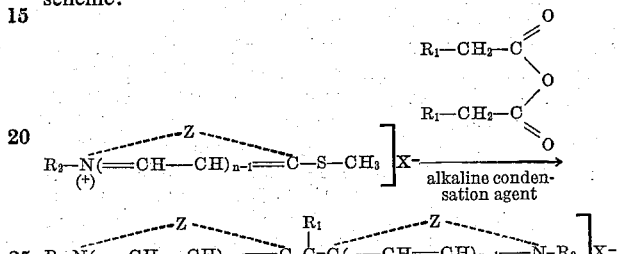

wherein: $R_2$ represents an alkyl group such as methyl, ethyl, propyl, isopropyl, butyl, isobutyl, allyl (vinyl methyl), β-hydroxyethyl, benzyl (phenyl methyl), carboxybenzyl etc. (e.g. an alkyl group of the formula $C_qH_{2q+1}$ wherein $q$ represents a positive integer from 1 to 4), $R_1$ represents an alkyl group such as methyl, ethyl, propyl, isopropyl, butyl, isobutyl, allyl (vinyl methyl), benzyl (phenyl methyl) etc. (e.g. an alkyl group of the formula $C_pH_{2p+1}$ wherein $p$ represents a positive integer from 1 to 4) or an aryl group such as phenyl, naphthyl etc. (e.g. an aryl group of the benzene or of the naphthalene series), or a hydrogen atom, $n$ represents a positive integer from 1 to 2, Z represents the nonmetallic atoms necessary to complete a heterocyclic nucleus containing from 5 to 6 atoms in the heterocyclic ring such as those selected from the group consisting of those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl) thiazole, etc.), those of the benzothiazole series (e.g. benzothiazole, 4-chloro-benzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole etc), those of the naphthothiazole series (e.g. alpha-naphthothiazole, beta-naphthothiazole, 5-methoxy-beta-naphthothiazole, 5-ethoxy-beta-naphthothiazole, 8-methoxy-alpha-naphthothiazole, 7-methoxy-alpha-naphthothiazole, etc.), those of the thionaphtheno-7',6',4,5-thiazole series (e.g. 4'-methoxythionaphtheno-7',6',4,5-thiazole etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. alpha-naphthoxazole, beta-naphthoxazole, etc.), those of the selenazole series (e.g. 4-methylselenazole, 4-phenylselenazole, etc.), those of the benzoselenazole series (e.g. benzoselenazole, 5-chloro-benzoselenazole, 5-methoxybenzoselenazole, 5-hydroxy-benzoselenazole, 4,5,6,7-tetrahydrobenzoselenazole, etc.), those of the naphthoselenazole series (e.g. alpha-naphthoselenazole, beta-naphthoselenazole, etc.), those of the thiazoline series (e.g. thiazoline, 4-methylthiazoline, 4-hydroxymethyl-4-methylthiazoline, 4,4-bis-hydroxymethyl-thiazoline, 4-acetoxymethyl-4-methyl-thiazoline, 4,4-bis-acetoxymethyl-thiazoline, etc.), those of the thiazolidine series (e.g. 2-benzthiazolylidene-4-thiazolidone etc.), those of the oxazoline series (e.g. oxazoline, 4-hydroxymethyl-4-methyl-oxazoline, 4,4-bis-hydroxymethyl-oxazoline, 4-acetoxy-methyl-4-methyl-oxazoline, 4,4-bis-acetoxymethyl-oxazoline, etc.), those of the oxazolidine series, those of the 3,3-dialkylindolenine series (e.g. 3,3-dimethylindolenine, 3,3,5-trimethylindolenine, 3,3,7-trimethylindolenine, etc.), those of the benzimidazole series (e.g. 1,3-diethylbenzimidazole, 1-ethyl-3-phenylbenzimidazole, 1-ethyl-3-hydroxyethyl-5,6-dichlorobenzimidazole, 1-ethyl-3-acetoxyethyl-5,6-dichlorobenzimidazole, 1,3-diethyl-5-chlorobenzimidazole, 1,3-diethyl-5,6-dibromo-chlorobenzimidazole, etc.), and X represents an acid radical such as chloride, bromide, iodide, perchlorate, benzenesulphonate, p-tolusulphonate, methylsulphate, ethylsulphate etc.

The condensation may be effected by heating the reagents together for preferably at least 30 minutes in the presence of an alkaline condensing agent, e.g. a tertiary amine such as triethylamine. The reaction temperature is preferably chosen between 100 and 160° C.; when acetic or propionic anhydride is used in the condensation reaction, the reaction may be effected at the reflux temperature of the anhydride; if butyric, phenyl propionic or phenyl acetic anhydride are used, the reaction temperature may be controlled by heating the reagents on an oil-bath.

Generally the reaction is nearly complete after 2 hours and in most cases a reaction time of 1 h. to 1.30 h. is sufficient.

As to the proportions of the reactants in the reaction mixture, generally an excess of anhydride is used over the theoretical amount needed.

The following examples are intended to illustrate our invention but are not to be regarded as limiting in any way the scope thereof.

*Example 1*

7.5 g. freshly prepared methyl mercaptobenzoxazole-dimethylsulphate are gently refluxed for 1.30 h. with 30 cm.³ of acetic anhydride and 4.9 cm.³ of triethylamine. After cooling the reaction mixture, 20 cm.³ of anhydrous ether are added and after standing overnight the crystals are sucked off and recrystallized twice in methanol. Melting point: 308–309° C. Absorption maximum: 362 mμ.

A dyestuff according to the probable formula

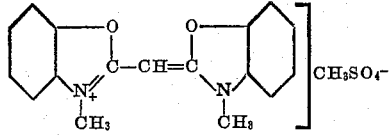

is obtained.

*Example 2*

11 g. of methyl mercaptobenzthiazole dimethylsulphate are refluxed for 1 h. with 70 cm.³ of acetic anhydride and 5.6 cm.³ of triethylamine. After cooling, the dyestuff is sucked off, washed out with ether and recrystallized in methanol. Melting point: 316° C. Absorption maximum: 420 mμ.

A dyestuff according to the probable formula

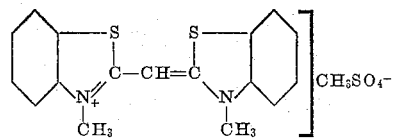

is obtained.

*Example 3*

10.5 g. of methyl mercaptobenzselenazole dimethylsulphate are refluxed for 1 h. with 60 cm.³ of acetic anhydride and 4.2 cm.³ of triethylamine. The dyestuff is sucked off in warm state and digested with warm ethanol. After sucking off, the dyestuff is recrystallized four times in acetic acid/water mixture (1:1 by volume). Melting point: 338–340° C. Absorption maximum: 430 mμ.

A dyestuff according to the probable formula

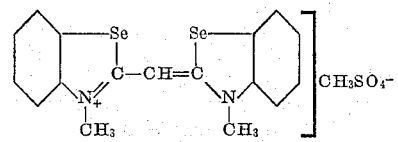

is obtained.

*Example 4*

9.21 g. of 2-methyl mercaptobenzthiazole dimethylsulphate are heated for 1 h. on an oil bath at 120° C. with 4.62 g. of phenyl acetic acid anhydride and 4.2 cm.³ of triethylamine. The reaction mixture is treated with 100 cm.³ of potassium iodide solution 10%. The liquid is decanted from the crude viscous dyestuff and the latter is extracted with chloroform. After evaporating the latter, the dyestuff is crystallized five times in a dioxane ethanol mixture (1:1 by volume) to which after each filtration a little ether is added until the solution becomes turbid. Melting point: 209–210° C. Absorption maxima: 468 mμ and 475 mμ.

A dyestuff according to the probable formula

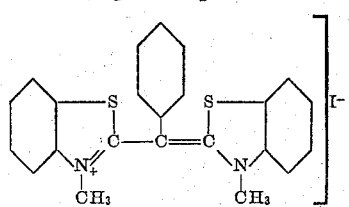

is obtained.

*Example 5*

3.07 g. of methyl mercaptobenzthiazole dimethylsulphate are heated for 1 h. at 120° C. with 1.7 g. of phenylpropionic acid anhydride, 3 cm.³ of pyridine and 1.4 cm.³ of triethylamine. After cooling, the dyestuff is sucked off, washed with ether, dissolved in ethanol, precipitated with a potassium iodide solution 10% and recrystallized in diacetone alcohol. Absorption maximum: 463 mμ.

A dyestuff according to the probable formula

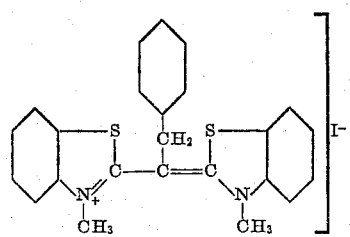

is obtained.

*Example 6*

3 g. of 2-methyl mercaptobenzthiazole dimethylsulphate are refluxed for 1 h. 15 min. with 20 cm.³ of propionic acid anhydride and 4.2 cm.³ of triethylamine. After cooling, the dyestuff is precipitated with ether as an oil.

After decanting, the dyestuff is dissolved in 20 cm.³ of methanol and again precipitated with 100 cm.³ of sodium perchlorate solution 10%. The dyestuff is recrystallized three times in ethanol and once in methanol. Melting point: 270–272° C. Absorption maximum: 466 mμ.

A dyestuff according to the probable formula

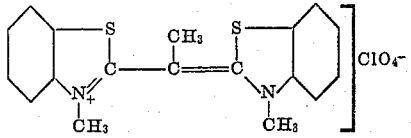

is obtained.

Example 7

9.2 g. of 2-methyl mercaptobenzoselenazole dimethylsulphate are heated for 1 h. 15 min. on an oil bath with 20 cm.³ of butyric acid anhydride and 7 cm.³ of triethylamine. The dyestuff is precipitated with petroleum solvent (boiling point 100–140° C.) and, after decanting, the crude dyestuff is dissolved in 30 cm.³ of methanol and again precipitated with petroleum solvent. The oil obtained is taken in a minimum quantity of ethanol, and this solution is treated with 20 cm.³ of sodium perchlorate solution 20%. After decanting, the dyestuff is recrystallized three times in ethylene glycol monomethylether to which after each filtration anhydrous ether is added until the solution becomes turbid. The product is allowed to crystallize for a long time in the refrigerator. Melting point: 206° C. Absorption maximum: 468 mμ.

A dyestuff according to the probable formula

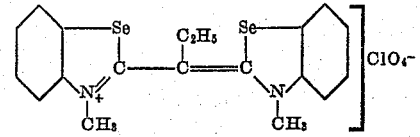

is obtained.

Example 8

4.8 g. of [2-(3-methylbenzthiazole)]-[5-(2-methylmercapto - 3 - ethyl - 4 - oxythiazolidine)] - merocyanine - p-tolusulphonate are refluxed in 20 cm.³ of acetic anhydride with 2.8 cm.³ of triethylamine. After 45 minutes, 1.4 cm.³ of triethylamine are added and again boiled for 45 minutes. After cooling, the dyestuff is sucked off, recrystallized three times in phenol, digested twice with ethanol, and each time sucked-off in warm state. Melting point: 318–320° C. Absorption maxima: 564 mμ and 569 mμ.

A dyestuff according to the probable formula

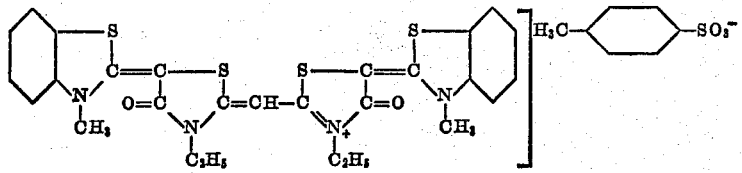

is obtained.

Example 9

7.4 g. of 1,3-dimethyl-2-methylmercapto-5,6-dichlorobenzimidazolium methylsulphate are refluxed for 4 h. in 10 cm.³ of acetic anhydride in the presence of 2.8 cm.³ of triethylamine. After cooling, the dyestuff is precipitated with ether and recrystallized twice from ethanol. Melting point: 275–277° C. Absorption maximum: 468 mμ.

A dyestuff according to the probable formula

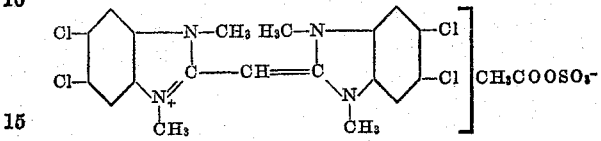

is obtained.

We claim:
1. Process for preparing a symmetrical monomethine cyanine dye, which comprises heating at a temperature between about 100° and 160° C. in the presence of an alkaline condensing agent of the type used in the preparation of cyanine dyes a compound of the general formula

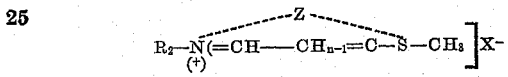

wherein $R_2$ represents an alkyl group of the formula $C_qH_{2q+1}$ with $q$ representing a positive integer from 1 to 4, $n$ represents a positive integer selected from the group of 1 and 2, Z represents the atoms necessary to complete a heterocyclic nitrogen nucleus of the type contained in cyanine dyes, and X represents an acid radical of the type used in cyanine dyes, together with a compound of the following general formula

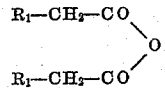

wherein $R_1$ represents a member selected from the group consisting of a hydrogen atom, an alkyl group of the formula $C_pH_{2p+1}$ with $p$ representing a positive integer from 1 to 4, a benzyl radical, and a phenyl radical.

2. The process according to claim 1, wherein Z represents the non-metallic atoms necessary to complete a heterocyclic nucleus selected from the group consisting of a benzoxazole nucleus, a benzothiazole nucleus, a benzoselenazole nucleus, a 5,6-dichloro-3-methylbenzimidazole nucleus, and a 3-ethyl-5-[3-methyl-benzothiazol-ylidene-(2)-] oxazolone-(4)-nucleus.

References Cited in the file of this patent

FOREIGN PATENTS

| | | |
|---|---|---|
| 369,236 | Great Britain | Mar. 16, 1932 |
| 431,141 | Great Britain | June 24, 1935 |
| 431,186 | Great Britain | June 24, 1935 |
| 562,754 | Great Britain | July 14, 1944 |
| 563,137 | Great Britain | Aug. 1, 1944 |

OTHER REFERENCES

Guha et al.: Journ. of the Am. Chem. Soc., vol. 47, pages 385 to 390 (1925).

Fry et al.: J. Chem. Soc., 1951, pages 1723–1726.

Chemical Abstracts, vol. 46, page 11181 C (1952) [abstract of Kiprianov, J. Gen. Chem., U.S.S.R., English translation, vol. 22, pages 365–372 (1952)].